H. Beebe.
Shirt Bosom.
N° 52817
Fig.1
Fig.2
Patented Feb. 27, 1866
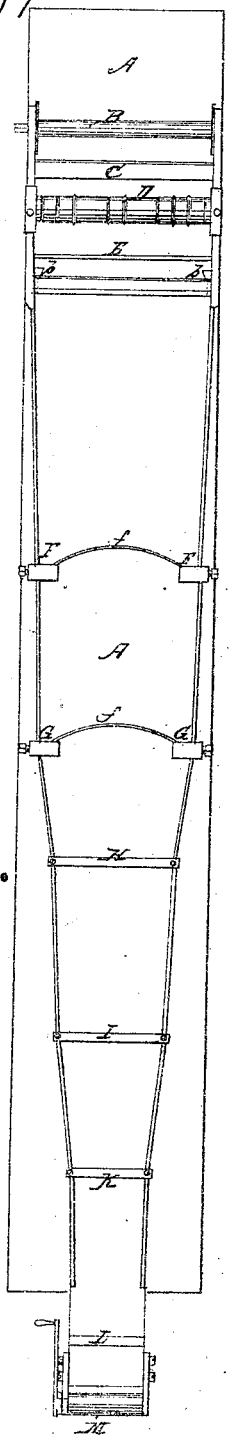
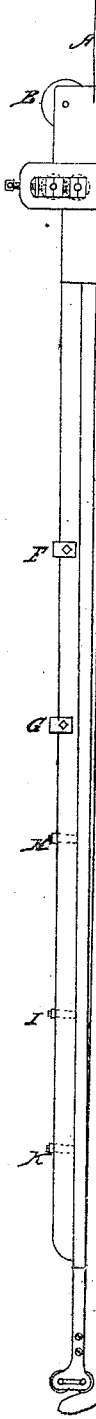
Sheet 1 — 4 Sheets H Beebe.
Shirt Bosom.
Nº 52,817    Patented Feb. 27, 1866

Sheet 3 – 4 Sheets

H. Beebe.
Shirt Bosom

Nº 52817      Patented Feb. 27, 1866

Witnesses
John H. Shumway
M. A. Hine

Inventor
H. Beebe
his atty
John E. Earle

H. Beebe.
Shirt Bosom
Nº 52817  Patented Feb 27, 1866

Sheet 4 – 4 Sheets

Witnesses.
John H. Shumway
M. A. Hine

Inventor.
H. Beebe
By his atty
John E. Earle

UNITED STATES PATENT OFFICE.

HUBBARD BEEBE, OF NEW HAVEN, CONNECTICUT.

IMPROVEMENT IN APPARATUS FOR FOLDING LINEN BOSOMS.

Specification forming part of Letters Patent No. 52,817, dated February 27, 1866.

*To all whom it may concern:*

Be it known that I, HUBBARD BEEBE, of New Haven, in the county of New Haven and State of Connecticut, have invented a new and useful Improvement in Machines for Folding Shirt-Bosoms; and I do hereby declare the following, when taken in connection with the accompanying drawings and the letters of reference marked thereon, to be a full, clear, and exact description of the same, and which said drawings constitute part of this specification, and represent, in—

Figure 3:
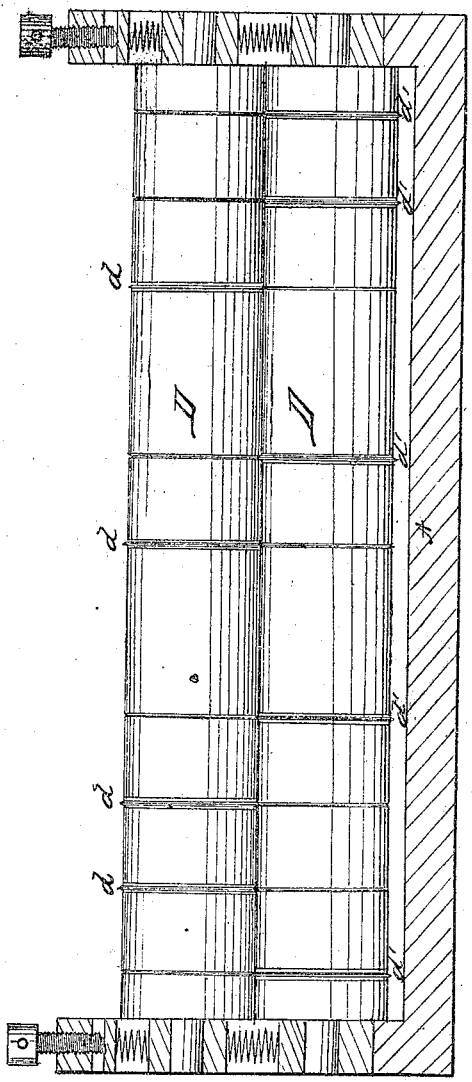
Figure 4:
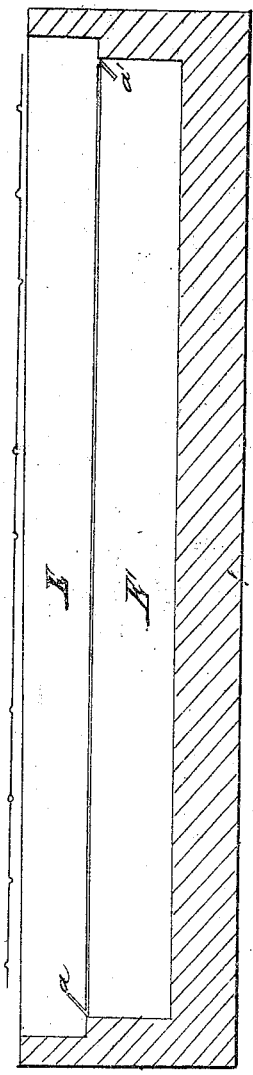
Figure 5:
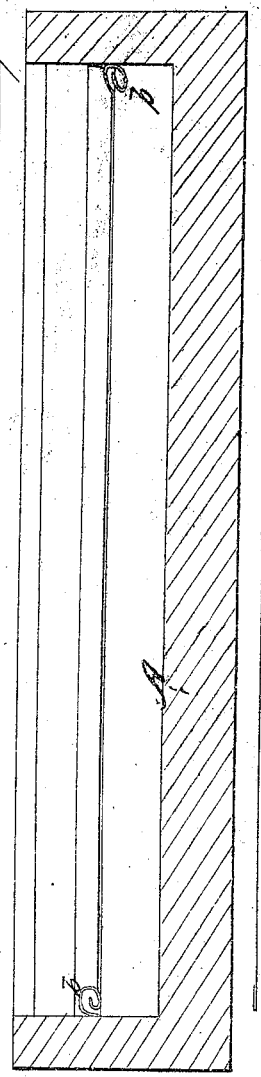
Figure 6:
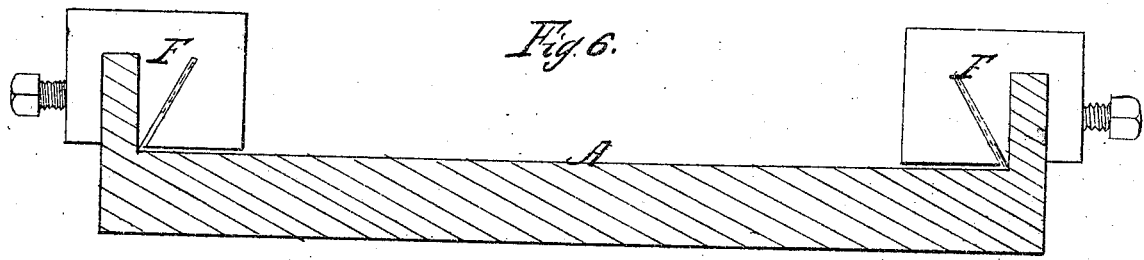
Figure 7:
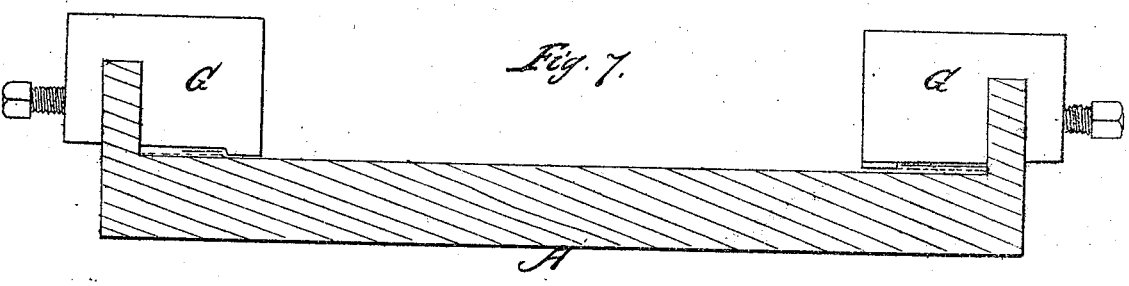
Figure 8:
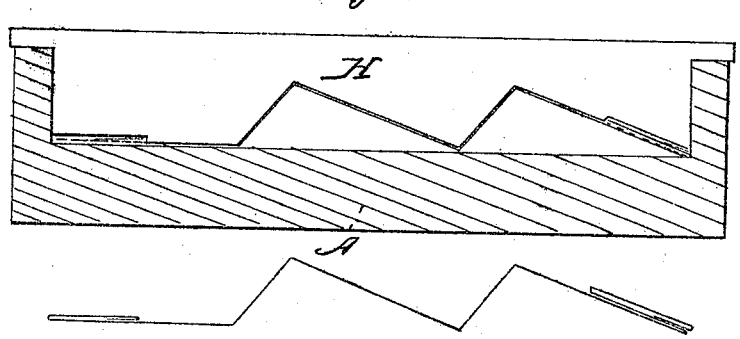
Figure 9:
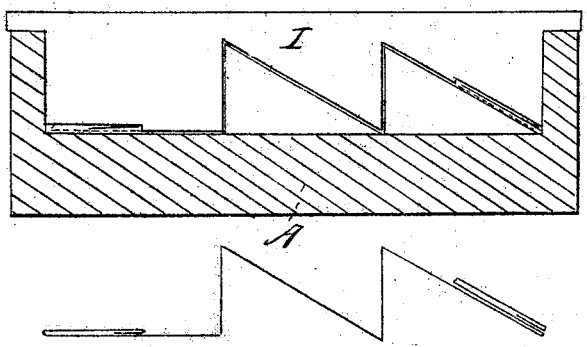
Figure 10:
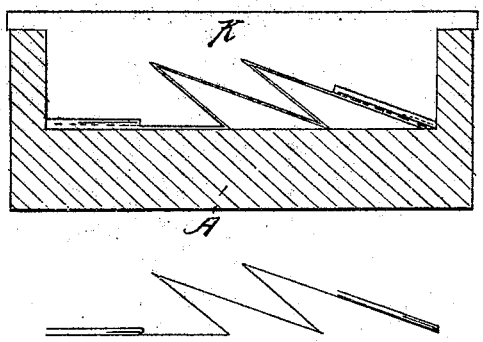
Figure 11:
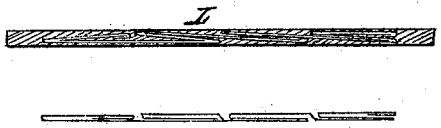

Figure 1, a top view; Fig. 2, a side view; and in Figs. 3 to 11, inclusive, cross-sections to illustrate the operation of the machine at different stages.

My invention is designed to form the folds for bosoms preparatory to stitching the plaits; and it consists in the mechanism for creasing the linen as a guide for the folds, combined with folders which, receiving the linen from the creasers, automatically fold and lay the plaits as the linen passes through the machine.

To enable others skilled in the art to construct and use my invention, I will proceed to describe the same as illustrated in the accompanying drawings.

A is the bed-plate. B is a spool, upon which the linen to be folded is rolled to be first cut to the required width. C is a smoother, under which the linen passes to the creasing-rolls D D′, and is employed for the purpose of removing any wrinkles which may be formed in the linen in the act of rolling onto the spool or in passing therefrom. The rollers D and D′ are placed one above the other in proper bearings, the said bearings provided with springs so as to yield to permit the introduction of the linen between the two rolls and to press firmly down thereon at proper intervals. On the said rolls are fixed the creasers $d$ and $d'$. The said creasers are formed to a sharp edge projecting slightly above the surface of the roll, and the other roll having grooves in its surface to correspond to the creasers $d$, so that when the linen is passed between the two rolls it will be creased to correspond with the creasers and grooves on the roll. The said creasers are placed upon their respective rolls so as to crease the linen wherever a fold is to be made, and the crease in the linen to be up or down accordingly as the fold is to be formed. From the rolls the linen, after having been creased, is passed on to the first folder, F, as seen enlarged, Fig. 4, which consists of two bars, E and E′. Into the upper bar a diagonal groove, $a$, is formed and into the lower bar a similar groove, $a'$, which turns one edge of the linen up and the other down, as denoted in blue, Fig. 4; thence passing on through other folders, $b$, (see enlarged, Fig. 5,) the two folds thus commenced are finished, as seen in blue, Fig. 5; thence passing on to the next folder F, (see enlarged, Fig. 6,) the two folds thus formed are guided through grooves formed in the folders F, each of the said grooves being provided with one or more thin tongues, as denoted in red and blue, which said tongues enter the folds already made, serving as a guide to retain the fold. The linen passes therefrom, as denoted in blue, Fig. 6; thence passing on to the next folders, G, as seen enlarged, Fig. 7, passing under the said folders G, which are provided with tongues corresponding to the folds already begun, and are pressed down, completing the folds, as seen in blue, Fig. 7; thence passing on to the folder H, (seen enlarged, Fig. 8,) in which grooves are formed with their angles corresponding to the creases in the linen, or the folds to be made, the linen passing therefrom in the form denoted in blue, Fig. 8; thence passing on to the folder I (seen enlarged in Fig. 9,) of similar construction to the folder H, from which the linen passes, as denoted in blue, Fig. 9, to the folder K, (seen enlarged, Fig. 10,) which also corresponds to the folders H and I, simply carrying the folds to a nearer finished state, as seen in blue, Fig. 10; thence passing on to the last folder L, which I form of thin metal, which completes the folds, passing therefrom to rollers M, between which the folded linen passes and is pressed, from whence it may be taken to be stitched in the usual manner. In passing through the folders F and G the linen between the folders lies flat upon the bed, and to retain it in such flat position and smooth I place thin metal springs $f$ bearing lightly upon the linen with a tendency to spread from the center outward. This completes my invention; and I am enabled to fold bosoms in the most perfect manner, which has heretofore only been done by hand—a slow and tedious operation.

To lay plaits of different widths it is only necessary to arrange the creasers and folders accordingly.

Having therefore thus fully described my invention, what I claim as new and useful, and desire to secure by Letters Patent, is—

The combination of folders with the creasing-rolls D and D', substantially in the manner and for the purpose specified.

HUBBARD BEEBE.

Witnesses:
JOHN E. EARLE,
JOHN H. SHUMWAY.